United States Patent
Valeri et al.

(10) Patent No.: US 9,227,566 B2
(45) Date of Patent: Jan. 5, 2016

(54) PSEUDO-TACH SIGNAL SYSTEM FOR A MOTOR VEHICLE

(71) Applicant: GM Global Technology Operations LLC, Detroit, MI (US)

(72) Inventors: Frank C. Valeri, Novi, MI (US); Scott M. Reilly, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/929,143

(22) Filed: Jun. 27, 2013

(65) Prior Publication Data

US 2015/0002287 A1   Jan. 1, 2015

(51) Int. Cl.
*B60Q 1/00* (2006.01)
*B60Q 5/00* (2006.01)

(52) U.S. Cl.
CPC ..................................... *B60Q 5/005* (2013.01)

(58) Field of Classification Search
None
See application file for complete search history.

(56) References Cited

U.S. PATENT DOCUMENTS

| | | | |
|---|---|---|---|
| 5,635,903 A * | 6/1997 | Koike et al. | 340/441 |
| 8,938,079 B2 * | 1/2015 | Valeri et al. | 381/86 |
| 2011/0010269 A1 * | 1/2011 | Ballard | 705/26.41 |
| 2011/0085674 A1 * | 4/2011 | Fujikawa | 381/86 |
| 2011/0087403 A1 * | 4/2011 | Fujikawa | 701/36 |
| 2012/0177214 A1 * | 7/2012 | Hera et al. | 381/73.1 |
| 2013/0294619 A1 * | 11/2013 | Valeri et al. | 381/86 |
| 2014/0121896 A1 * | 5/2014 | Valeri et al. | 701/36 |
| 2015/0016627 A1 * | 1/2015 | Barlow et al. | 381/86 |

* cited by examiner

Primary Examiner — Travis Hunnings
(74) Attorney, Agent, or Firm — Cantor Colburn LLP

(57) ABSTRACT

A pseudo-tach signal system includes a pseudo-tach signal modeling module, and an output module operatively connected to the pseudo-tach signal modeling module. The output module exports a pseudo-tach signal based audible sound.

20 Claims, 2 Drawing Sheets

PSEUDO-TACH SIGNAL SYSTEM FOR A MOTOR VEHICLE

FIELD OF THE INVENTION

The subject invention relates to the art of motor vehicles and more particularly, to a pseudo-tach signal system for a motor vehicle.

BACKGROUND

Motor vehicles including conventional drivetrains emit sounds during acceleration events, deceleration events, and gear changes. Many consumers have come to rely on these sounds as a sign of proper mechanical function. Changes in these sounds may indicate, to certain consumers, that a problem may exist in the drivetrain. Other consumers may associate the sounds with a desired performance level of the motor vehicle. Certain sounds are associated with "high performance" vehicles. An absence of the sounds may detract from an overall enjoyment of the motor vehicle.

Many newer motor vehicles include electric, hybrid electric or fixed gear drivetrains. Electric drivetrains produce little noise during operation. Noise produced by hybrid electric drivetrains is distinct from noises associated with more conventional drivetrains. Fixed gear drivetrains do not include shift points and thus lack any sounds associated therewith. Many users of newer automobiles are uncomfortable with the lack of, or change in, sound produced by electric and hybrid electric motor vehicles. Accordingly, it is desirable to provide a system for producing drivetrain sounds that consumers have come to expect to perceive when operating a motor vehicle. There are also times when motor vehicles produce narrow band sounds (often perceived as tones) that occupants in the vehicle find incongruous with the operation of the vehicle. At other times tones can be produced that are understandable but have a frequency range and amplitude that may detract from an overall vehicle experience.

SUMMARY OF THE INVENTION

In accordance with an exemplary embodiment, a pseudo-tach signal system includes a pseudo-tach signal modeling module, and an output module operatively connected to the pseudo-tach signal modeling module. The output module exports a pseudo-tach signal based audible sound.

In accordance with another exemplary embodiment, a motor vehicle includes a drivetrain having an engine and a transmission, and a pseudo-tach signal system. The pseudo-tach signal system includes a pseudo-tach signal modeling module, and an output module operatively connected to the pseudo-tach signal modeling module, the output module exporting a pseudo-tach signal based audible sound.

In accordance with another exemplary embodiment, a method of generating motor vehicle tones includes receiving an acoustic signal indicator, generating a pseudo-tach signal associated with the acoustic signal indicator, modeling a pseudo-tach signal based audible sound, and outputting the pseudo-tach signal based audible sound through a motor vehicle speaker.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
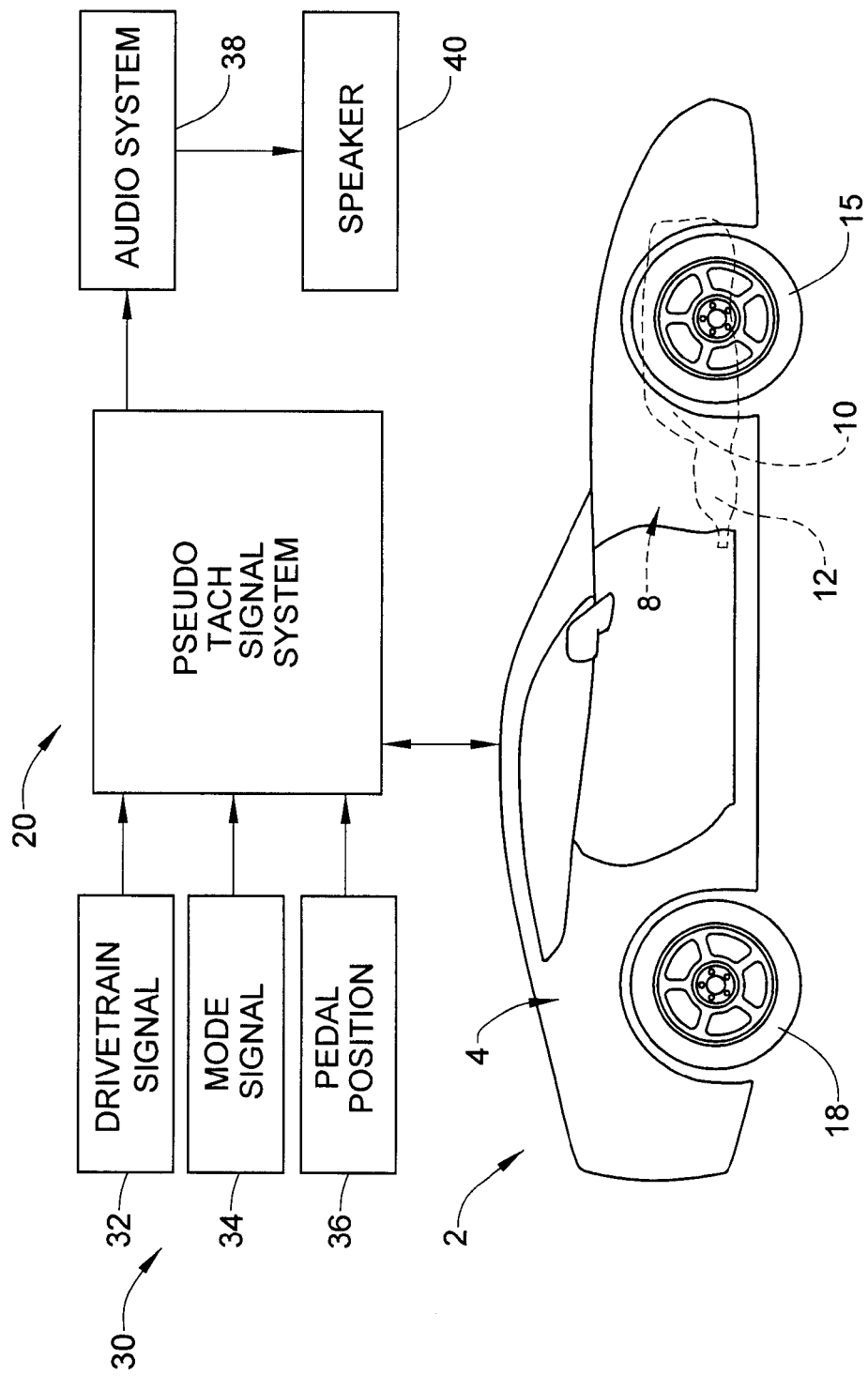
FIG. 1 is a plan view of a motor vehicle including a pseudo-tach signal system in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term "module" refers to an application specific integrated circuit (ASIC), an electronic circuit, a processor (shared, dedicated, or group), memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

A motor vehicle in accordance with an exemplary embodiment is indicated generally at 2 in FIG. 1. Motor vehicle 2 includes a body 4 supported by a chassis (not shown). Motor vehicle 2 also includes a drivetrain 8 having an engine 10 and a transmission 12. Engine 10 may include electric drive systems and hybrid drive systems. Transmission 12 may include fixed gear transmissions and constant velocity transmissions. Drivetrain 8 is mechanically linked to a set of front wheels 15 and/or a set of rear wheels 18. Drivetrain 8 provides a motive force that propels motor vehicle 2.

In accordance with an exemplary embodiment, motor vehicle 2 includes a pseudo-tachometer or "pseudo-tach" signal system 20 which, as will be discussed more fully below, generates audible sounds that mimic sounds of rotating machinery or mask objectionable sounds to enhance a user's impression of the motor vehicle. At this point it should be understood that the term "audible sounds" includes both narrow band and broadband sounds and/or combinations thereof. Pseudo-tach signal system 20 is operatively connected to an input signal system 30. Input signal system 30 transmits one or more acoustic signal indicators that may take the form of a drivetrain signal 32 such as a speed signal, a torque signal, an acceleration signal and the like to pseudo-tach signal system 20. Input signal system 30 may also transmit a vehicle selected mode signal 34 such as the activation of a sport mode; and/or accelerator pedal position signal 36. The signals are transmitted along various vehicle bus systems (not shown).

Pseudo-tach signal system 20 generates a pseudo-tachometer or "pseudo-tach" signal that is used to form audible tones that are output to an audio system 38 and through a speaker 40. At this point, it should be understood that the term "pseudo-tach signal" represents an artificial RPM based signal derived from sensed vehicle control or condition signals in motor vehicle 2. The audible tones enhance an overall operating experience of motor vehicle 2. More specifically, the audible tones may add to, or blend existing perceivable tones, or take the place of non-existent tones drivers have come to expect from an operating mechanical drivetrain.

Figure 2:
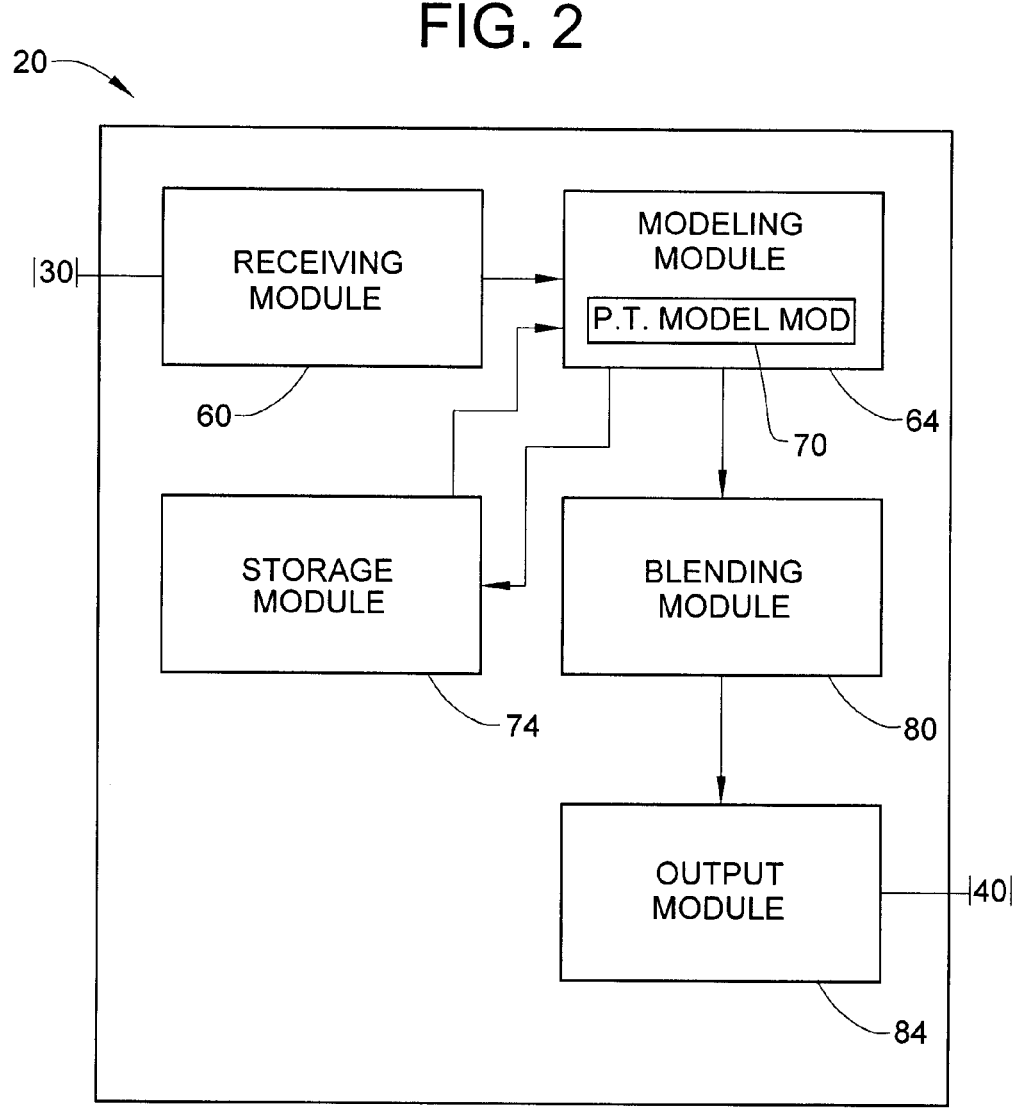
FIG. 2 is a dataflow diagram of the pseudo-tach signal system of FIG. 1.

In further accordance with the exemplary embodiment illustrated in FIG. 2, pseudo-tach signal system 20 includes a receiving module 60 operatively connected to input signal members 30. Receiving module 60 receives and processes input signals from input signal members 30. The input signals are passed to a modeling module 64 that includes a pseudo-tach modeling model 70. Pseudo-tach modeling module 64 generates a pseudo-tach signal that is associated with one or more of the input signals received through input signal system 30. Pseudo-tach modeling module 64 may draw an existing pseudo-tach signal from a storage module 74 or may create a new pseudo-tach signal using pseudo-tach modeling model 70. New pseudo-tach signals may then be stored in storage module 74 for later retrieval. In either case, modeling module 64 relies upon the pseudo-tach signal to model or create useful audible sounds that improve passenger compartment soundscape. More specifically, the pseudo-tach signal is an artificial signal used to create a new, previously non-existent, audible sound that simulates sounds produced by, for example, rotating machinery such as that found in drivetrain 8 or sounds that may mask objectionable sounds in motor vehicle 2.

In accordance with an aspect of the exemplary embodiment, pseudo-tach signal system 20 also includes a blending module 80 operatively connected to modeling module 64. Blending module 80 crafts the pseudo-tach signal based audible sound to blend or synchronize the pseudo-tach signal with existing tones in motor vehicle 2. The pseudo-tach signal based audible sound is then passed to an output module 84 operatively connected to speaker 40. In accordance with one example, pseudo-tach signal system 20 creates tone orders that mimic sounds produced by an accelerating vehicle, including sounds produced by engine 10 and sounds produced by transmission 12. Input signal system 30 may transmit signals indicating how aggressively or non-aggressively a vehicle is being driven and, in response, produces a pseudo-tach signal based audible sound that is blended or synchronized with existing vehicle tones to provide a desired audible feedback to a driver. The pseudo-tach signal based audible sound may be designed to mimic the behavior of an RPM signal of engine 10, transmission 12, or any drive shafts or rotating components that would be powering a vehicle through a discreet gear transmission. The pseudo-tach signal based audible sound may also represent other rotating components such as tires, axles, bearings and the like. Further, the pseudo-tach signal based audible sound may represent an audible sound that will mask other, objectionable sounds in the motor vehicle. When appropriate, the pseudo-tach signal based audible sound may be broadcast as tones into passenger spaces of motor vehicle 2.

At this point it should be understood that the invention provides a system that creates sounds which mimic an accelerating vehicle that may be equipped with an internal combustion engine and/or a discreet gear transmission. These sounds can be broadcast outside the vehicle as part of a pedestrian alert system and/or inside the vehicle to enhance the driving experience. The invention utilizes signals that are transmitted on various vehicle bus systems to provide an indication of a vehicle driving state. The signals may include vehicle speed, engine/motor speed and torque, vehicle selected modes, accelerator pedal position, and vehicle acceleration. The signals may be utilized to determine a driving state of the vehicle or how aggressively the vehicle was being driven.

In response to the received signals, the pseudo-tach signal system generates a new signal (pseudo-tachometer signal) that is used to form a pseudo-tach signal based audible sound that may be synchronized with this known driving state of the vehicle. The pseudo-tach signal may be created as a new signal or may be retrieved from a storage module that stores previously created signals or a database of expected signals. When appropriate the pseudo-tach signal based audible sound is output as perceivable tones to a driver to enhance an overall driving experience. The pseudo-tach signal based audible sound may be blended with existing tones, or may be output to mask existing tones, to enhance an overall driving experience of the motor vehicle. In addition to outputting tones that are perceivable to a driver, the pseudo-tach signal system may amplify the pseudo-tach signal and produce an external output that may be perceivable by pedestrians While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A pseudo-tach signal system for an electric motor vehicle comprising:
    a pseudo-tach signal modeling module; and
    an output module operatively connected to the pseudo-tach signal modeling module, the output module exporting a pseudo-tach signal based audible sound representative of an operating condition of the electric motor vehicle.

2. The pseudo-tach signal system according to claim 1, further comprising: a blending module including a blending model that synchronizes the pseudo-tach signal based audible sound with existing audible tones.

3. The pseudo-tach signal system according to claim 1, further comprising: a storage module including one or more stored pseudo-tach signals.

4. The pseudo-tach signal system according to claim 1, further comprising: a receiving module configured and disposed to receive one or more input signals from a motor vehicle.

5. The pseudo-tach signal system according to claim 4, wherein the one or more input signals includes one of a speed signal, a torque signal, an accelerator pedal position signal, an acceleration signal, and a vehicle selected mode signal.

6. The pseudo-tach system according to claim 1, further comprising: a speaker operatively connected to the output module, the pseudo-tach signal based audible sound being exported to the speaker.

7. A motor vehicle comprising:
    a drivetrain including an electric motor and a transmission; and
    a pseudo-tach signal system including:
    a pseudo-tach signal modeling module; and
    an output module operatively connected to the pseudo-tach signal modeling module, the output module exporting a pseudo-tach signal based audible sound representative of an operating condition of the electric motor.

8. The motor vehicle according to claim 7, further comprising: a blending module including a blending model that synchronizes the pseudo-tach signal based audible sound with an existing audible signal generated by the drivetrain.

9. The motor vehicle according to claim 7, further comprising: a storage module including one or more stored pseudo-tach signals.

10. The motor vehicle according to claim 7, further comprising: a receiving module configured and disposed to receive one or more input signals from a motor vehicle.

11. The motor vehicle according to claim 10, wherein the one or more input signals includes one of a speed signal, a torque signal, an accelerator pedal position signal, an acceleration signal, and a vehicle selected mode signal.

12. The motor vehicle according to claim 7, further comprising: a speaker operatively connected to the output module, the pseudo-tach signal based audible sound being exported to the speaker.

13. A method of generating electric motor vehicle tones comprising:
   receiving an acoustic signal indicator indicative of an operating condition of the electric motor vehicle;
   generating a pseudo-tach signal associated with the acoustic signal indicator;
   modeling a pseudo-tach signal based audible sound on the pseudo-tach signal; and
   outputting the pseudo-tach signal based audible sound through a motor vehicle speaker.

14. The method of claim 13, wherein generating the pseudo-tach signal based audible sound represents an audible signal that simulates an audible output of a rotating machine.

15. The method of claim 14, wherein modeling the pseudo-tach based audible sound includes creating an artificial order signal that matches existing audible tones in the motor vehicle.

16. The method of claim 13, wherein generating the pseudo-tach signal includes retrieving the pseudo-tach signal from a storage module.

17. The method of claim 16, further comprising: storing a modeled pseudo-tach signal in the storage module.

18. The method of claim 13, wherein receiving an acoustic signal indicator includes receiving one of one of a speed signal, a torque signal, an accelerator pedal position signal, an acceleration signal, and a vehicle selected mode signal.

19. The method of claim 13, further comprising: blending the pseudo-tach signal based audible sound with existing audible motor vehicle tones.

20. The method of claim 13, further comprising: amplifying the pseudo-tach signal based audible sound to be perceived externally of the motor vehicle.

* * * * *